E. E. YOST.
WEDGE BOLT FOR LOCOMOTIVE PEDESTALS AND THE LIKE.
APPLICATION FILED MAY 10, 1912.
1,037,100.
Patented Aug. 27, 1912.
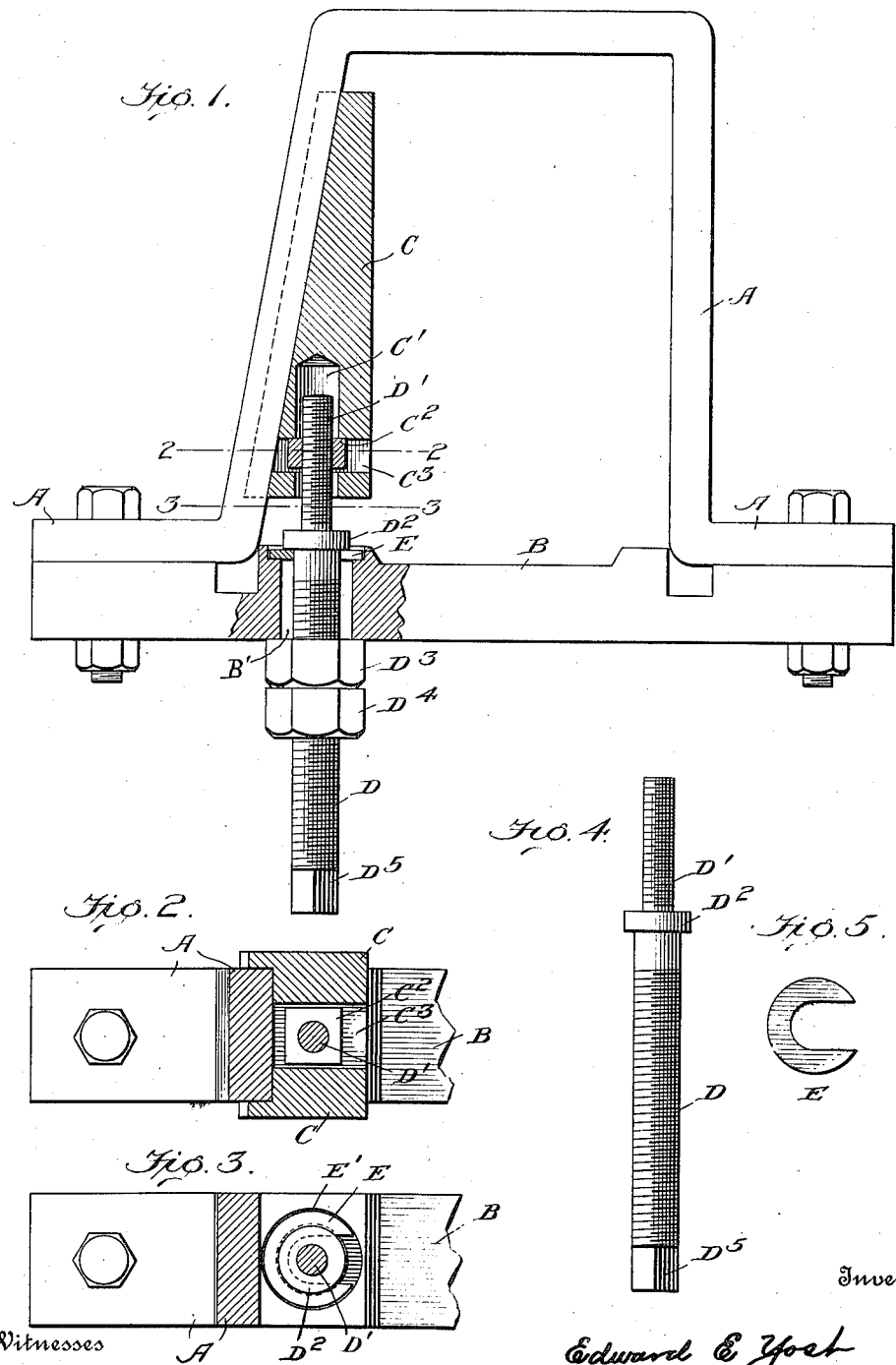
Witnesses
Edwin L. Bradford
Robert Craig Greene
Inventor
Edward E. Yost
By Wallace Greene,
Attorney

UNITED STATES PATENT OFFICE.

EDWARD E. YOST, OF MANCHESTER, NEW YORK.

WEDGE-BOLT FOR LOCOMOTIVE-PEDESTALS AND THE LIKE.

1,037,100. Specification of Letters Patent. Patented Aug. 27, 1912.

Application filed May 10, 1912. Serial No. 696,542.

*To all whom it may concern:*

Be it known that I, EDWARD E. YOST, citizen of the United States, residing at Manchester, in the county of Ontario and State of New York, have invented certain new and useful Improvements in Wedge-Bolts for Locomotive-Pedestals and the Like, of which the following is a specification, reference being had therein to the accompanying drawing.

My invention relates to wedge-bolts, especially such as are used where axle bearings are to be adjusted laterally, and an object of the invention is to provide devices such that a broken part, commonly the bolt itself, may be readily and quickly removed and replaced, and without disturbing any other important parts of the structure.

Bolts of this general character are commonly used in many situations, and removal of the bolt is often desirable, although with the constructions commonly used removal is a matter of more or less difficulty. In locomotives, for example, each driving wheel axle is held in a pedestal frame, with a wedge alongside each, and the stay-plate below, in which the wedge-bolt works, is commonly a member weighing perhaps two hundred pounds and extending under all the axles and secured to the pedestal frame by many bolts. In this case, owing to great strains at high speed, breaking or injury often makes it necessary to renew a particular wedge-bolt or wedge, and this commonly requires the removal of the heavy stay-plate, an operation which is often difficult and expensive, requiring much valuable time.

My invention contemplates the replacing of any individual wedge-bolt in a few minutes by any mechanic without disturbing the stay-plate. The use of the invention is, however, by no means limited to this particular work, but is of material advantage in smaller axle bearings and the like where the saving is less marked.

The bearing frame or pedestal is represented in the drawings by a simple member not in exact form of the frame or the pedestal ordinarily used practically, but thought adequate for illustration since the particular construction or form of that part is not here material.

In these drawings, Figure 1 is an end elevation of a bearing frame with the wedge and wedge-bolt in place, parts being broken away to show construction. Fig. 2 is a section on the line 2—2, Fig. 1. Fig. 3 is a section on the line 3—3, Fig. 1. Fig. 4 shows in side view, the wedge-bolt detached. Fig. 5 is a plan view of a washer seen in place in Figs. 1 and 3.

In these views, A represents any bearing frame, or pedestal, in which axle bearings are held and B any ordinary stay-plate, or pedestal brace, spanning the space between the opposite upwardly extending inner faces of the frame A.

C represents the usual wedge for adjusting the axle bearing laterally. The wedge is adjusted by a stay-bolt having a lower threaded portion D with a squared end $D^5$, an upper threaded portion D', and a heavy intermediate integral annular flange $D^2$ which rests upon a heavy U-shaped washer E, lying in a recess E', in the stay-plate, this recess being conveniently formed by counter-boring the bolt hole B' which is itself large enough to permit the flange $D^2$ to pass freely. The stay-bolt bears below the stay-plate a nut $D^3$ and a lock-nut $D^4$, and its upper portion enters a recess C' in the wedge and engages a loose but non-revoluble nut therein, the nut being readily passed into or out of the wedge through an aperture $C^3$.

If the nuts $D^3$, $D^4$ be properly unscrewed, the bolt may be rotated by means of its squared end to force the wedge upward, while by suitable rotation of both the bolt and the nut $D^3$ the wedge may be drawn downward. When any desired adjustment has been made, all the parts may be locked by means of the nuts $D^3$, $D^4$.

For removing the stay-bolt, the nuts $D^3$, $D^4$ are either lowered or removed, the stay-bolt is advanced by rotation until the flange is at some distance above the stay-plate, the washer is raised out of its recess and removed, laterally, from the bolt, and the bolt is then unscrewed from its nut $C^2$ and withdrawn downwardly. If desired, the nut $C^2$ may then be replaced by another, or the wedge-bolt may itself be removed. New members may be substituted for any or all the removed parts, and re-assembling requires simply a reversal of the steps followed in removal. Obviously, the washer is not necessarily single nor of any fixed thickness if under particular circumstances variation is desirable.

What I claim is:

1. The combination with a frame having a downwardly open space for an axle bearing, of a wedge movable along one side of said space, a stay-plate secured to said frame, and having below the wedge a bolt hole alining therewith, a wedge-bolt lying in the bolt hole, engaging said wedge through a threaded connection adapted to rise and fall freely in the bolt hole while thus connected, displaceable means for limiting the downward movement of the wedge-bolt in the bolt hole, and a nut working on the wedge-bolt just below the stay-plate.

2. The combination with a suitable frame for an axle bearing, of a wedge provided below with an aperture to receive a wedge bolt and movable along the side of the bearing space to adjust the bearing laterally, a wedge bolt provided between its ends with a lateral projection and having its upper end in engagement with the wedge, a stay plate secured to said frame and provided with a bolt hole adapted to allow the bolt and its projection to move up and down therein while so engaged, and means for at will obstructing the path of said projection.

3. The combination with a frame and stay-plate for axle bearings, of a wedge for laterally adjusting such bearings, a nut removably and non-revolubly held in the wedge, a wedge-bolt passing freely through the stay-plate, engaging said nut, and provided with an integral collar above the stay-plate, a member, carried by the stay-plate, movable laterally into and out of the path followed by said collar when the bolt moves downward, to narrow the bolt hole and support said collar, and a nut working upon the threaded portion of the wedge-bolt below the stay-plate.

4. The combination with a frame for an axle bearing and a wedge movable on the frame to adjust such bearing laterally, of a stay-plate secured to the frame below and provided with a bolt hole below said wedge, a downwardly removable revoluble wedge-bolt capable of lateral bodily adjustment in said bolt hole and detachably connected to the wedge above, nuts carried by the threaded portion of the wedge-bolt just below the stay-plate, and means for at will limiting the downward movement of the wedge-bolt while it is in place.

5. The combination with a frame for an axle bearing, a bearing-adjusting wedge movable along one side of the frame, and a stay-plate having a bolt hole below the wedge, of a wedge-bolt provided with a lateral projection, adapted to pass as a whole through said bolt-hole and primarily unsupported therein, a U-shaped washer adapted to slide laterally into and out of the path of said projection, bridging the open circumferential portion of the bolt hole and preventing the otherwise free direct downward movement of the bolt while itself supported by the stay-plate, a nut carried by the wedge and detachably engaging the upper end of the stay-bolt, and locking nuts working upon the stay-bolt just below the stay-plate.

6. The combination with a bearing frame of inverted U-shape, of a wedge movable along one side of the frame to adjust the bearing therein laterally, a stay-plate secured to the frame below and provided with a bolt hole counterbored above and directly below said wedge, a nut carried by the wedge, a wedge-bolt lying in said bolt-hole, engaged by said nut and having above the body of the stay-plate an integral flange adapted to pass through said bolt hole, a U-shaped removable washer normally lying in the recess formed by the counterbore and supporting said flange, and locking nuts working on the wedge-bolt just below the stay-plate.

In testimony whereof I affix my signature in presence of two witnesses.

EDWARD E. YOST.

Witnesses:
PATRICK J. SHANNON,
J. A. CARMODY.